United States Patent [19]
Tanaka et al.

[11] Patent Number: 5,510,690
[45] Date of Patent: Apr. 23, 1996

[54] BATTERY PACK, BATTERY DISCRIMINATION CONTROL APPARATUS AND METHOD THEREFOR

[75] Inventors: Yoichiro Tanaka; Hiroyuki Tsuji, both of Tokyo, Japan

[73] Assignee: Kabushiki Kaisha Toshiba, Kawasaki, Japan

[21] Appl. No.: 113,908

[22] Filed: Aug. 31, 1993

[30] Foreign Application Priority Data

Aug. 31, 1992 [JP] Japan .................................. 4-257319
Nov. 30, 1992 [JP] Japan .................................. 4-320736

[51] Int. Cl.$^6$ ........................................................ H02J 7/00
[52] U.S. Cl. ........................................ 320/2; 320/6; 320/15
[58] Field of Search ........................................ 320/2, 6, 15

[56] References Cited

U.S. PATENT DOCUMENTS 4,965,738  10/1990  Bauer et al. .
5,122,722   6/1992  Goedken et al. ................. 320/35 X
5,164,652  11/1992  Johnson et al. .

FOREIGN PATENT DOCUMENTS 9103661   7/1991  Germany .
2-193533  7/1990  Japan .
3-203525  9/1991  Japan .
4-54617   2/1992  Japan .
4-55924   2/1992  Japan .
5-82137  11/1993  Japan .

OTHER PUBLICATIONS

*(Corresponds to U.S. application Ser. No. 08/026,219, Continuatin of U.S. application Ser. No. 07/633,358).

Primary Examiner—Peter S. Wong
Assistant Examiner—Robert E. Nappi
Attorney, Agent, or Firm—Oblon, Spivak, McClelland, Maier & Neustadt

[57] ABSTRACT

A Li ion battery main body and a charge/discharge circuit for controlling charge/discharge of the Li ion battery main body in accordance with a difference between an NiH battery and an Li ion battery are arranged in a battery pack housing having the same shape, mounting mechanism, and connection terminals as those of a standard battery pack using the NiH battery. The battery pack also includes a discrimination terminal for discriminating the type of battery.

29 Claims, 10 Drawing Sheets

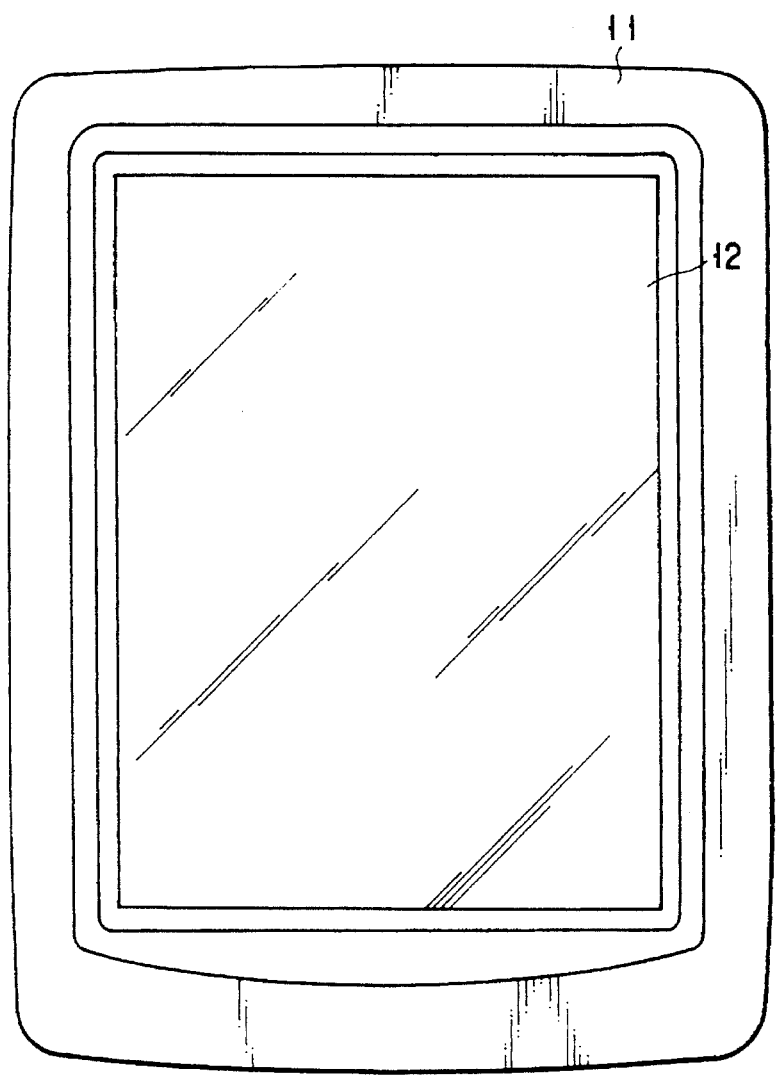
F I G. 1A
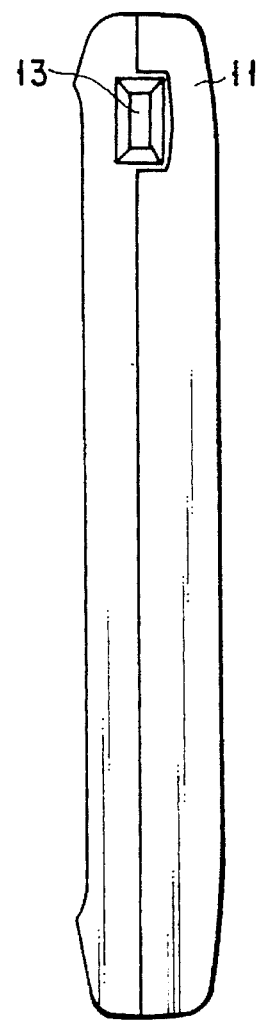
F I G. 1B
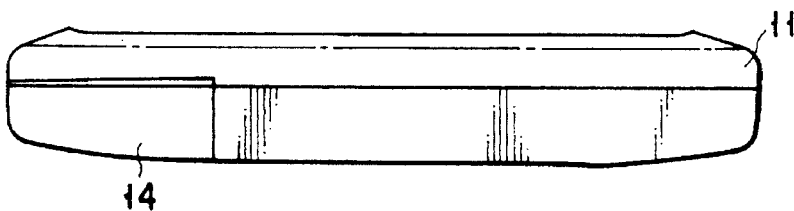
F I G. 1C

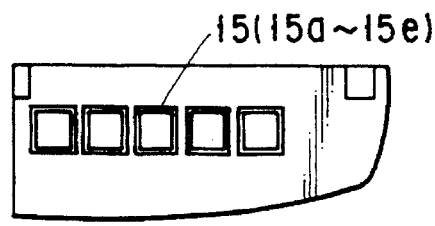
FIG. 3A
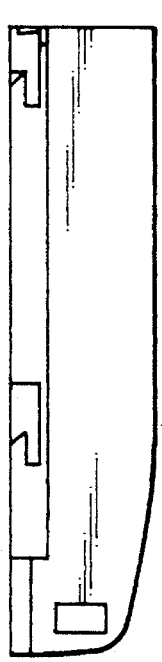    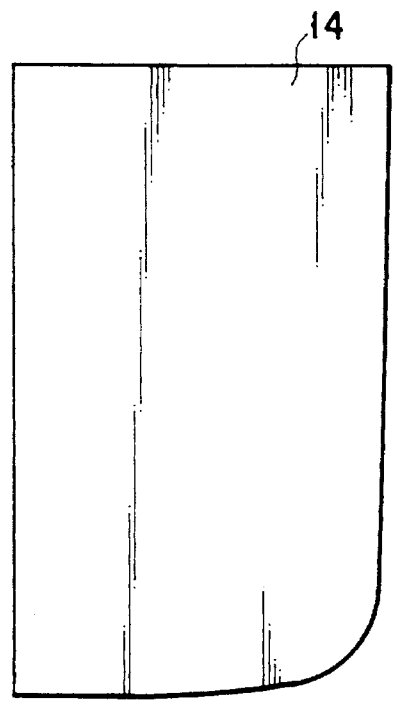    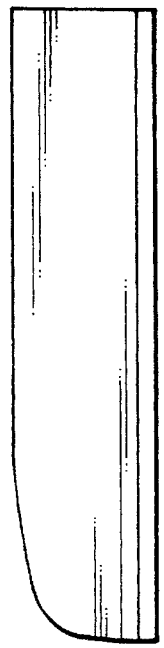
FIG. 3B        FIG. 3C        FIG. 3D
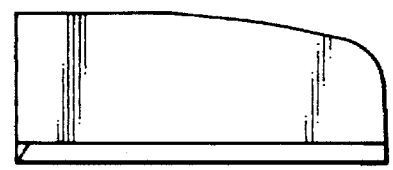
FIG. 3E

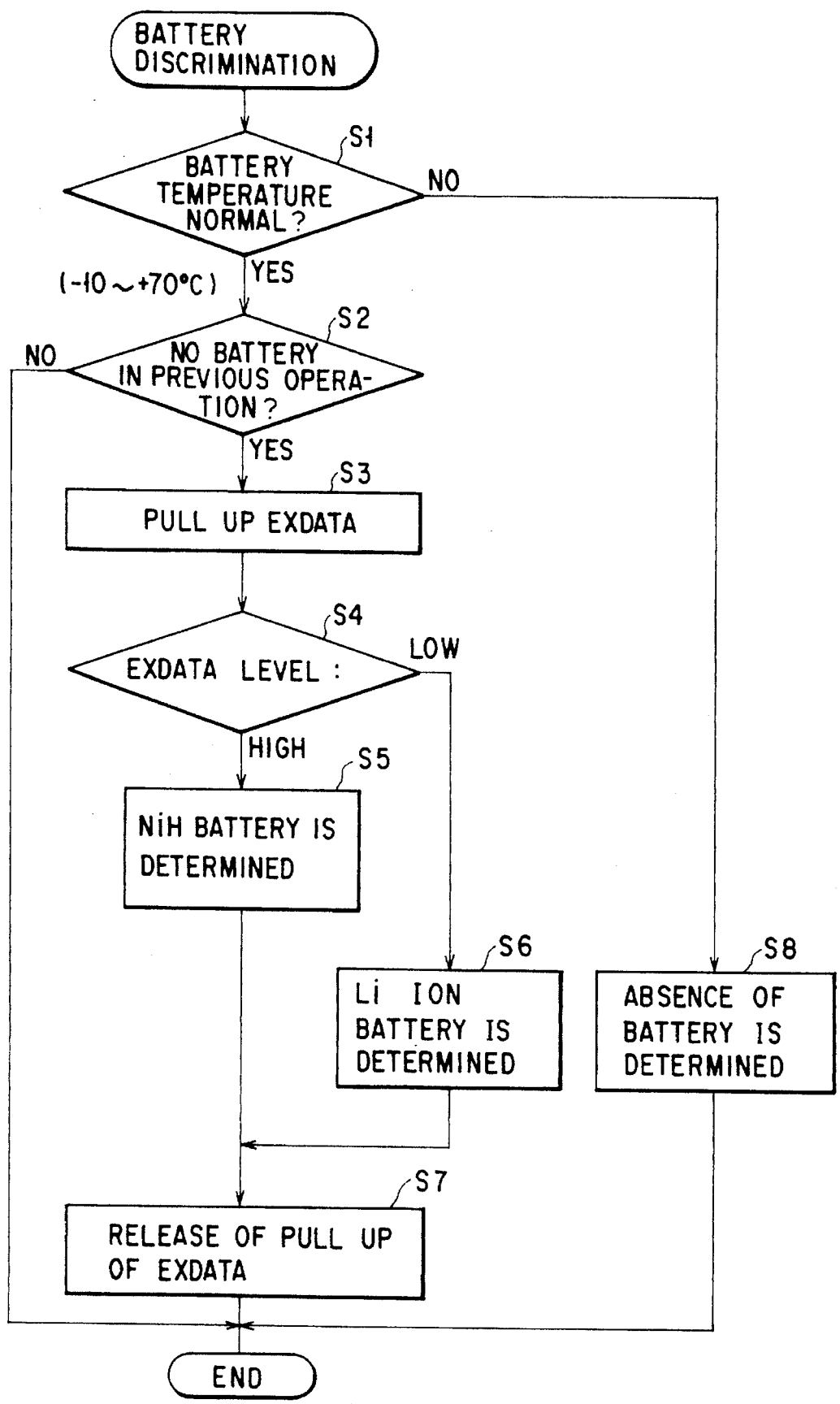
F I G. 12

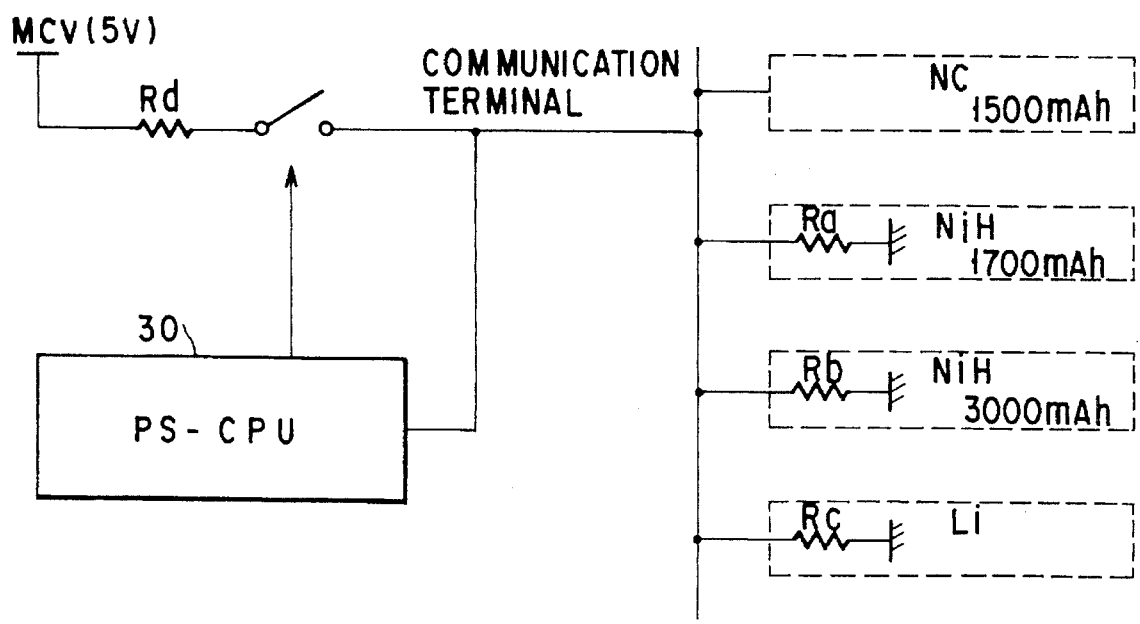
F I G. 13
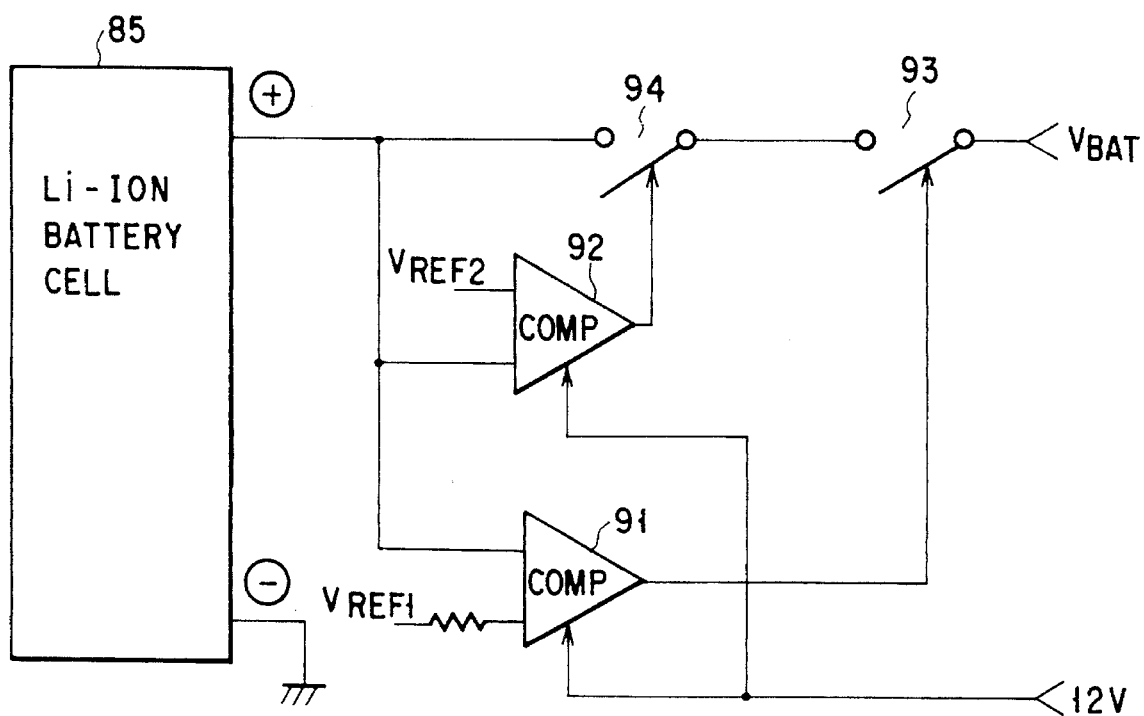
F I G. 14

BATTERY PACK, BATTERY DISCRIMINATION CONTROL APPARATUS AND METHOD THEREFOR

BACKGROUND OF THE INVENTION

1. Field of the Invention

The present invention relates to a battery pack, a battery discrimination control apparatus, and a method therefor, all of which are applied to a data processing apparatus assumed for use in a portable state.

2. Description of the Related Art

Various types of compact, lightweight data processing apparatuses such as personal computers in consideration of portability have been recently planned and sold. In a data processing apparatus of this type, the continuous operating time of the data processing apparatus is limited because a secondary battery such as a nickel-cadmium (to be referred to as Ni-Cd hereinafter) or nickel-hydrogen (to be referred to as NiH hereinafter) battery is used as a power supply. The battery capacity may be increased to prolong the continuous operating time of the apparatus, but the data processing apparatus becomes bulky and heavy as a whole. Under these circumstances, strong demand has arisen for a battery having a sufficiently high power efficiency. No battery which satisfies this requirement has been proposed. At present, a battery having a large power capacity within the allowable range in consideration of the size and weight of the apparatus is mounted and used. Therefore, if a user wants to continuously operate the apparatus for a long period of time, a supplementary battery is prepared or an AC adapter is connected to the apparatus at the sacrifice of portability and mobility.

A battery using lithium ions (to be referred to as Li ions hereinafter) has been recently developed as a secondary battery having a capacity equivalent to at least an NiH battery and a great reduction in weight. The Li ion batteries have been practically used in some home electric appliances.

The Li ion battery has charge/discharge characteristics greatly different from those of the conventional Ni-Cd and NiH batteries. In particular, when the Li ion battery is charged under the same control as in the Ni-Cd and NiH battery, the Li ion battery may easily explode. For this reason, dedicated power control is required for the Li ion battery. The Li ion battery cannot be used in place of the conventional Ni-Cd or NiH battery in a data processing apparatus using the Ni-Cd or NiH battery.

SUMMARY OF THE INVENTION

It is an object of the present invention to provide a battery pack, a battery discrimination control apparatus, and a method therefor, capable of realizing continuous use of a data processing apparatus for a long period of time, using a battery as a power supply, without greatly modifying the data processing apparatus main body.

According to the present invention, an Li ion battery main body and a charge/discharge circuit for controlling charge/discharge of the Li ion battery main body in accordance with a difference between an NiH battery and an Li ion battery are arranged in a battery pack housing having the same shape, mounting mechanism, and connection terminals as those of a standard battery pack using, e.g., the NiH battery. The battery pack using the Li ion battery can be realized although the data processing apparatus main body uses this battery pack equivalent to the standard battery pack using the NiH battery. The overall weight of the data processing apparatus can be greatly reduced.

In addition, according to the present invention, a Li ion battery main body, a charge/discharge circuit for controlling charge/discharge of the Li ion battery main body in accordance with a difference between an NiH battery and an Li ion battery, and discriminating means using, e.g., a resistor for discriminating the Li ion battery main body connected to the discrimination terminal from the standard NiH battery pack are arranged in a battery pack housing having a discrimination terminal and the same shape, mounting mechanism, and connection terminals as those of the standard battery pack using, e.g., the NiH battery. The operating power supply terminal of the charge/discharge circuit serves also as the discrimination terminal. The data processing apparatus main body can discriminate whether the mounted battery pack is a pack using the NiH battery or the Li ion battery. At the same time, the operating power supply terminal of the charge/discharge circuit for controlling charge/discharge of the Li ion battery need not be additionally arranged.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A through 1C are a front view, a right side view, and a bottom side view, respectively, showing the outer appearance of a data processing apparatus according to an embodiment of the present invention;

FIGS. 3A through 3E are a front view and four side views of a battery pack of the embodiment shown in FIGS. 1A through 1C;

FIG. 12 is a flow chart showing the contents of battery discrimination;

FIG. 13 is a view showing a method of discriminating different types of batteries; and FIG. 14 is a detailed circuit diagram of a charge/discharge circuit for the Li ion battery shown in FIG. 9.

DETAILED DESCRIPTION OF THE PREFERRED EMBODIMENTS

Figure 2:
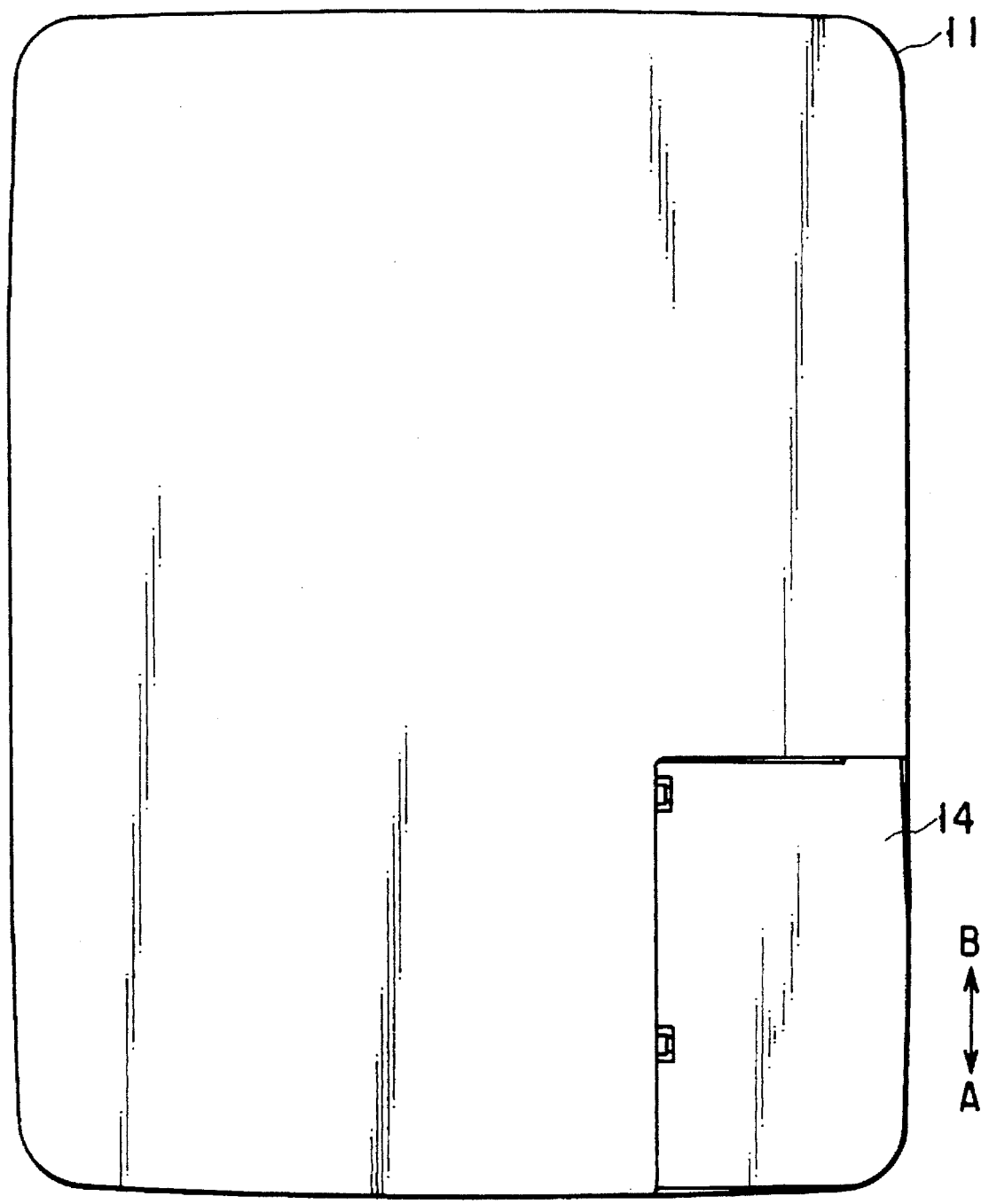
FIG. 2 is a rear view showing the outer appearance of the data processing apparatus according to the embodiment shown in FIGS. 1A through 1C.

Embodiments of the present invention will be described with reference to the accompanying drawings.

FIGS. 1A through 1C and FIG. 2 show the outer appearance of a data processing apparatus according to an embodiment of the present invention. FIGS. 1A through 1C are a front view, a right side view, and a bottom side view of the data processing apparatus, and FIG. 1 is a rear view thereof. Referring to FIGS. 1A through 1C and FIG. 2, reference numeral 11 denotes a main body case. The main body case 11 is a low-profile rectangular housing having, e.g., an A4 size and a thickness of about 3 cm.

An almost entire area excluding the front surface and the peripheral portion of the main body case 11 constitutes an input/output unit 12 integrally formed with a transparent tablet input unit on a liquid crystal display panel with a back light. A user designates an arbitrary position or writes a character on the tablet with an input stylus pen (not shown) in accordance with the contents displayed on the input/output unit 12, thereby performing an input operation.

A power switch 13 is arranged on the right side surface of the main body case 11. The user turns on/off the power switch 13 to power on/off the apparatus.

A battery pack 14 serving as a power supply is mounted in the lower left portion of the rear surface of the main body case 11. The battery pack 14 comprises, e.g., an NiH battery. When the battery pack 14 is slid in a direction indicated by an arrow B in FIG. 2, the battery pack is mounted in the main body case 11. When the battery pack 14 is slid in a direction indicated by an arrow A, the battery pack 14 can be removed from the main body case 11.

FIGS. 3A through 3E show the outer appearance of the battery pack 14. The battery pack 14 has a shape to be integrally formed with the main body case 11 when the battery pack 14 is mounted in the main body case 11. As shown in FIG. 3A, a power supply connection terminal block 15 (15a through 15e) is formed on one side surface in the mounting direction of the arrow B.

Figure 4:
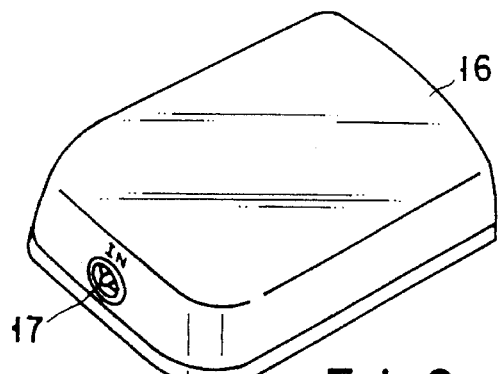
FIG. 4 is a perspective view showing the outer appearance of an external battery connection attachment of the embodiment shown in FIGS. 1A through 1C.

An external battery connection attachment 16 shown in FIG. 4 is prepared as a component having the same shape, mounting mechanism, and connection terminal block 15 (15a through 15e) as those of the battery pack 14.

The attachment 16 does not incorporate a battery and does not have a function as a power supply. However, the attachment 16 has a power supply input terminal 17. When the attachment 16 is mounted in the main body case 11 in place of the battery pack 14, and a power supply output plug of an external battery (to be described later) is connected to the power supply input terminal 17, the attachment 16 can supply a power supply voltage to the respective circuits in the main body case 11 as in the battery pack 14.

Figure 5A:
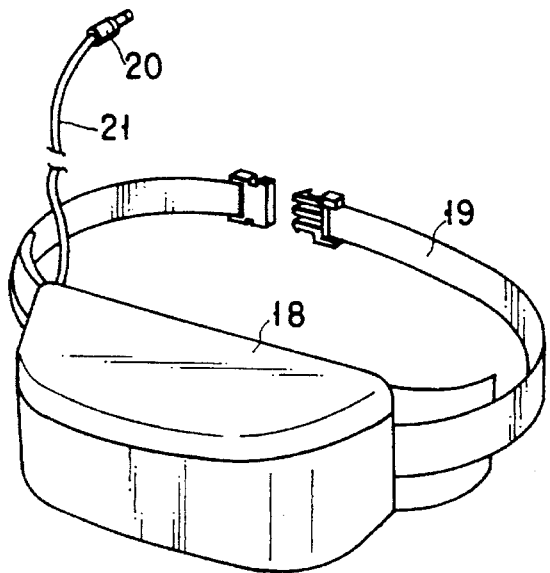
FIGS. 5A and 5B are perspective views showing the arrangement of an external battery connected to the attachment shown in FIG. 4.

FIG. 5A shows the arrangement of an external battery for supplying a power supply voltage to the power supply input terminal 17 of the attachment 16. For example, this arrangement is constituted by a waist bag portion 18 having, e.g., a waistband 19, and a main body connection cable 21 extending from the waist bag portion 18 and having a power supply output plug 20 at its distal end.

Figure 5B:
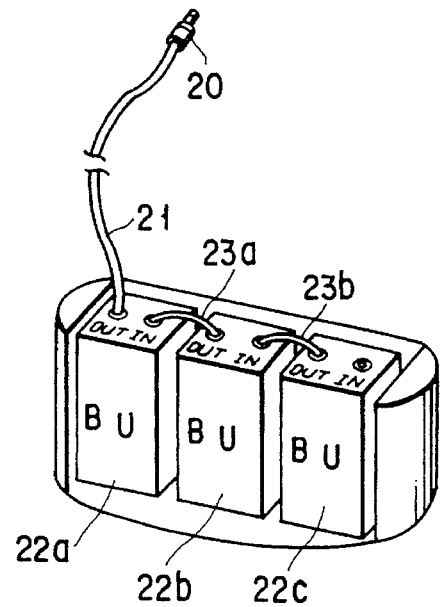

FIG. 5B shows the battery structure in the waist bag portion 18. The waist bag portion 18 comprises a plurality (e.g., three) of battery units 22a through 22c and battery connection cables 23a and 23b for connecting these units 22a through 22c.

Figure 6A:
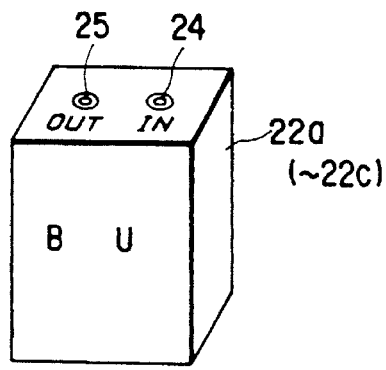
FIGS. 6A and 6B are a perspective view and a circuit diagram, respectively, showing a battery unit shown in FIG. 5B.
Figure 6B:
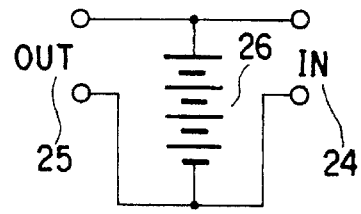

In this case, each of the battery units 22a through 22c do not have a + (positive) terminal and a − (negative) terminal, but has an input terminal 24 and an output terminal 25, as shown in FIG. 6A. These input and output terminals 24 and 25 are connected in parallel to a structure 26 of series-connected battery cells, as shown in FIG. 6B.

In the above terminal arrangement, for example, when the input terminal 24 of the battery unit 22a is connected to the output terminal 25 of the battery unit 22b through the battery connection cable 23a, and the input terminal 24 of the battery unit 22b is connected to the output terminal 25 of the battery unit 22c through the battery connection cable 23b, the three battery units 22a through 22c can be connected in parallel to each other. When the main body connection cable 21 is led from the output terminal 25 of the battery unit 22a, and the power supply output plug 20 connected to the distal end of the cable 21 is connected to the power supply input terminal 17 of the attachment 16, a voltage can be continuously applied from a large-capacity power supply obtained by parallel connection of the three battery units 22a through 22c.

In the above arrangement, the user puts on the waist bag portion 18 through the waistband 19 and mounts the attachment 16 in the data processing apparatus in place of the battery pack 14. The user then connects the power supply output plug 20 at the distal end of the connection cable 21 led from the waist bag portion 18 to the power supply input terminal 17 of the attachment 16, the data processing apparatus can be continuously operated for a considerably longer period of time than that operated with the battery pack 14.

In this case, the attachment 16 has the same shape, mounting mechanism, and connection terminals as those of the battery pack 14 integrally mounted in the main body case 11. Without arranging a dedicated external battery connection terminal or the like, the outer appearance and operability of the data processing apparatus are not impaired even if the attachment 16 is mounted in place of the battery pack 14.

The attachment 16 itself does not have a battery structure but an almost hollow structure except for some wiring lines. For this reason, the attachment 16 is much lighter than the battery pack 14. The weight acting on the arms of the user can be smaller than that which uses the battery pack 14 when the user carries to use the data processing apparatus. The user is less tired in operating the apparatus with the attachment 16 than in operating the apparatus with the battery pack 14.

A battery pack using a Li ion battery according to another embodiment of the present invention will be described with reference to the accompanying drawings. In this case, the outer appearance of a data processing apparatus main body and a battery pack is the same as that in FIGS. 1A through 3E, and a detailed description thereof will be omitted.

Figure 7:
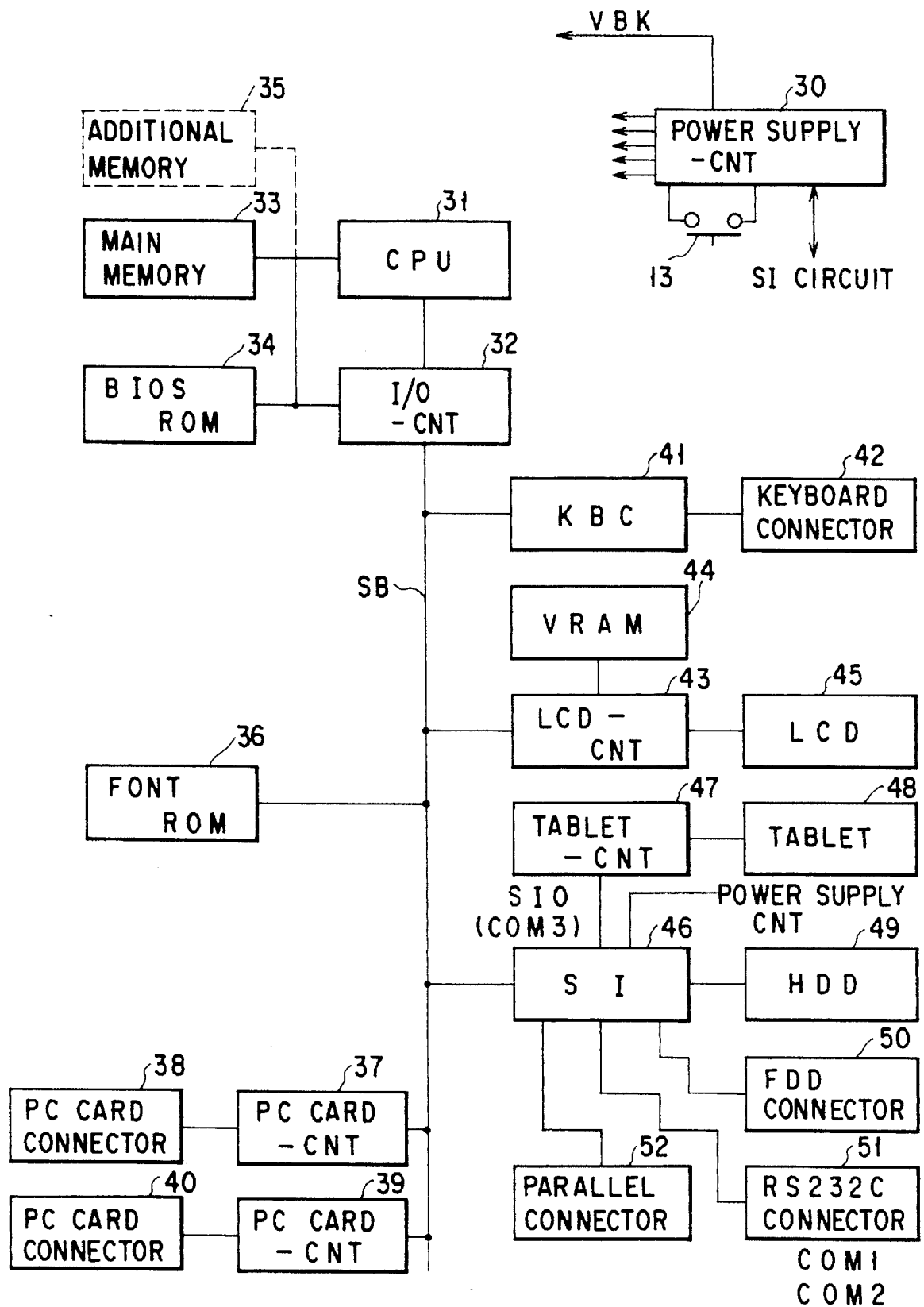
FIG. 7 is a block diagram showing functional blocks of the overall system according to another embodiment of the present invention.

FIG. 7 shows the functional arrangement of the overall system arranged in a main body case 11. Reference numeral 30 denotes a power supply controller (POWER SUPPLY-CNT), connected to a power switch 13, for performing power supply control of the overall system. Reference numeral 31 denotes a microprocessor (CPU) for controlling the operations of the overall system; and 32, an input/output controller (I/O-CNT) for controlling input and output operations of the microprocessor 31.

The microprocessor (to be referred to as a CPU hereinafter) 31 accesses a BIOS-ROM 34 for storing a BIOS (basic input/output operating system) and a main memory 33 (or an additional memory 35 if it is used) to perform various data processing operations upon the start of programs in accordance with the input designation.

The input/output controller 32 controls input and output operations between the CPU 31 and the respective circuits connected to a system bus SB in accordance with the BIOS stored in the BIOS-ROM 34. A font ROM 36 for storing character font data, a first PC card controller (PC CARD-CNT) 37, a second PC card controller 39, a keyboard controller (KBC) 41, a liquid crystal controller (LCD-CNT) 43, and a SI (superintegration) circuit 46 are connected to the system bus SB.

The PC card controllers 37 and 39 control input and output operations when various expanded cards (PC cards) for expanding the functions of the personal computer, such as a memory card and a modem card, are mounted through PC card connectors 38 and 40.

The keyboard controller 41 controls input and output operations when an external keyboard (not shown) is connected through a keyboard connector 42.

The liquid crystal controller 43 develops display data sent through the system bus SB in a VRAM 44 and controls the display operations of a liquid crystal panel (LCD) 45 arranged on the front surface of the apparatus housing. The liquid crystal panel 45 is of a transmission type constituted by a dot matrix of, e.g., 640 vertical dots × 480 horizontal dots. Although not shown, a back light constituted by, e.g., a fluorescent tube is embedded on the rear surface side of the liquid crystal panel 45.

The SI (superintegration) circuit 46 is connected to the power supply controller 30 in a manner to be described later. The SI circuit 46 is also connected to a tablet controller (TABLET-CNT) 47, a built-in hard disk drive (HDD) 49, a floppy disk (FDD) connector 50, an RS232C connector 51, and a parallel connector 52 and controls data exchange between these components.

The tablet controller 47 controls the input operations of a tablet 48 integrally formed on the liquid crystal display panel 45. When a point is designated or a character is written on the tablet 48 with a stylus pen (not shown), the tablet controller 47 sequentially sends coordinate position data to the input/output controller 32 through the SI circuit 46.

The floppy disk connector 50 is used to externally connect a floppy disk drive. The RS232C connector 51 has two serial ports COM1 and COM2 for connecting a data communication apparatus such as a modem. The parallel connector 52 is used to connect a parallel data output/input device such as a printer.

Figure 8:
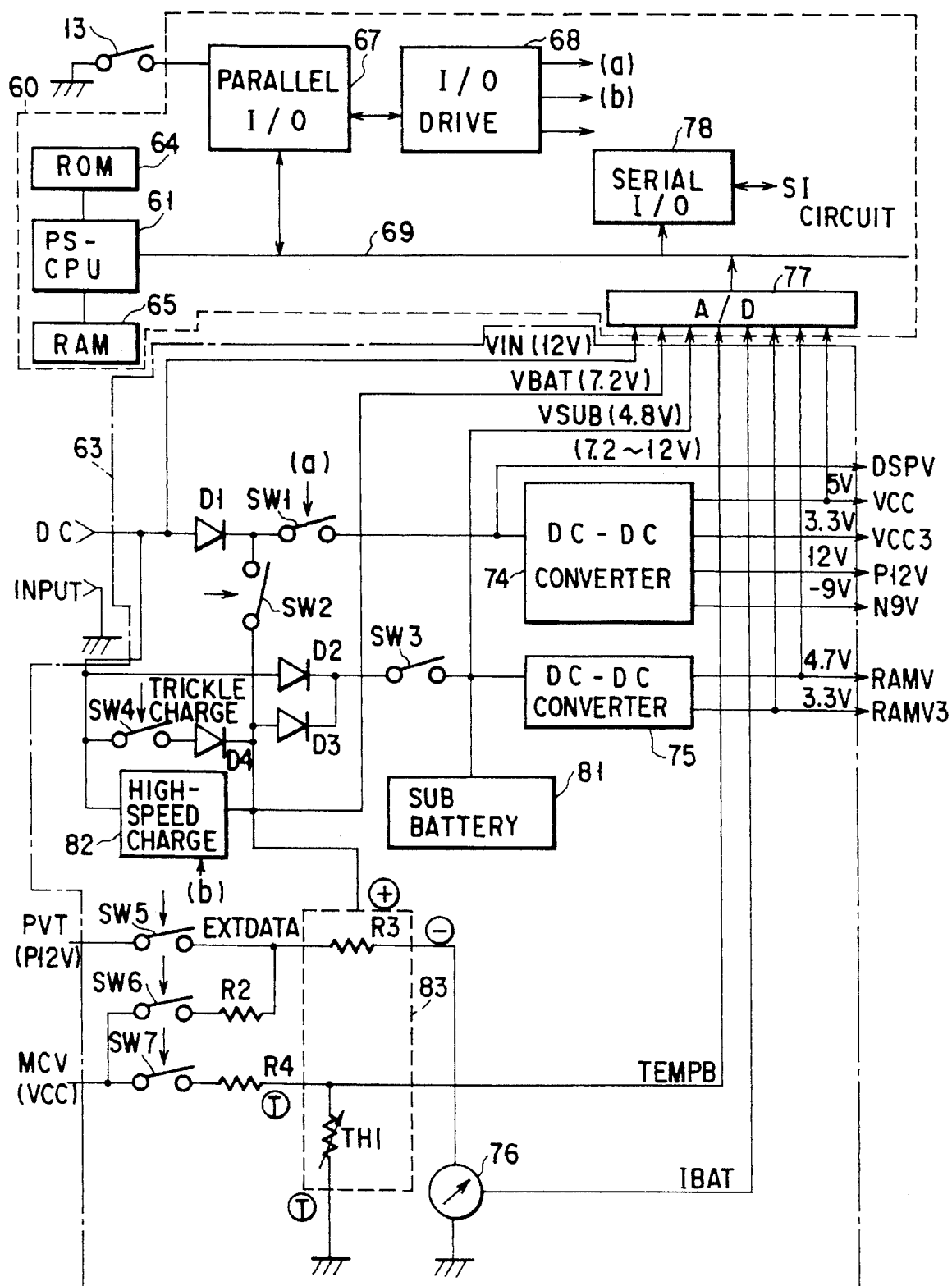
FIG. 8 is a block diagram showing the detailed circuit arrangement of a power supply board of the embodiment shown in FIG. 7.

FIG. 8 is the detailed circuit diagram of the power supply controller 30 shown in FIG. 7. A power supply control microcomputer 60 is a one-chip microcomputer comprising a power supply control CPU (PS-CPU) 61, an internal ROM 64, an internal RAM 65, a parallel I/O 67, an I/O driver 68, an A/D converter 78, and a serial I/O 78. The PS-CPU 61 always monitors and controls the power supply regardless of the ON/OFF operation of the power switch. The PS-CPU 61 performs centralized management of the system power supply, such as control of a power supply circuit 63 for generating and outputting various operating voltages for operating the system, ON/OFF control of the power supply upon operation of the power switch 13, discrimination of a mounted battery pack, and charge/discharge control according to charge/discharge control parameters of the battery pack in accordance with a power supply program stored in the internal ROM 64.

The power supply circuit 63 serving as the major component of the power supply controller 30 includes a switch SW1 for applying or interrupting to apply voltages to the respective circuits in the system in accordance with a control signal (a) output from the PS-CPU 61 through the parallel I/O 67 and the I/O driver 68.

In response to the control signal (a) from the I/O driver 68, the switch SW1 supplies or interrupts to supply a power supply output (DC input in FIG. 8) from an external power supply adapter (not shown) through a diode D1 or an input of a power supply output VBAT (7.2 V) from a battery pack 83 to a DC-DC converter 74 through a switch SW2, and a supply output of a display voltage DSPV for the display panel 45 and the back light thereof.

The DC input as the power supply output from the power supply adapter (not shown) is supplied as VIN (12 v) to an A/D converter 77 directly, to a DC-DC converter 75 and a sub battery 81 through a diode D2 and a switch SW3, to the battery pack 83 as trickle charge through a switch SW4 and a diode D4, and to the battery pack 83 through a high-speed charge circuit 82 operated in response to a control signal (b) from the I/O driver 68.

As will be described in detail later, the battery pack 83 comprises a Li ion battery unlike the battery pack 14 having the NiH battery. A power supply voltage is applied to the battery pack 83 by a trickle or a high-speed charge. The battery pack 83 is charged with this power supply voltage and outputs a primary power supply voltage. The output primary power supply voltage is applied to the DC-DC converter 74 through the switches SW2 and SW1 and to the DC-DC converter 75 through the diode D3 and the switch SW3.

The battery pack 83 is also applied with a voltage PVT of 7.2 to 12 V and a voltage MCV of 5 V.

More specifically, the voltage PVT (P12V) applied through a switch SW5 and the voltage MCV (VCC) applied through a switch SW6 and a resistor R2 are connected to one terminal of a resistor R3 in the battery pack 83 through a multi-functional terminal (to be described later). The other terminal of the resistor R3 is connected to an ammeter 76 through the negative terminal of the power supply. A current value IBAT obtained by the ammeter 76 is supplied to the A/D converter 77. A voltage level signal EXDATA at the multi-functional terminal is also supplied to the A/D converter 77, although not shown.

The voltage MCV applied through a switch SW7 and a resistor R4 is connected to the other terminal of a thermistor TH1, one end of which is arranged in the battery pack 83, through a temperature detection terminal T. A voltage level signal TEMPB at the temperature detection terminal T is supplied to the A/D converter 77.

When the battery pack 83 is not mounted, the sub battery 81 outputs a primary power supply voltage to the DC-DC converter 75 in place of the battery pack 83. A voltage VSUB (4.8 V) generated by the sub battery 81 is also applied to the A/D converter 77.

The DC-DC converter 74 receives the primary power supply voltage through the switch SW1 and generates circuit operating voltages VCC (MCV to be described later) (5 V), VCC3 (3.3 V), P12V (PVT to be described later) (12 V), and N9V (−9 V) as the operating power supply voltages (secondary power supply voltages) of the respective circuits in the apparatus. The DC-DC converter 74 applies the above voltages to the corresponding circuits. In particular, the DC-DC converter 74 applies the circuit operating voltage VCC (5 V) to the A/D converter 77.

On the other hand, the DC-DC converter 75 receives the primary power supply voltage through the switch SW3 and generates RAMV (4.7 V) and RAMV3 (3.3 V) as backup power supply voltages VBK (secondary power supply voltages) in the apparatus and applies these voltages to the A/D converter 77, the main memory 33, and the additional memory 35.

Figure 9:
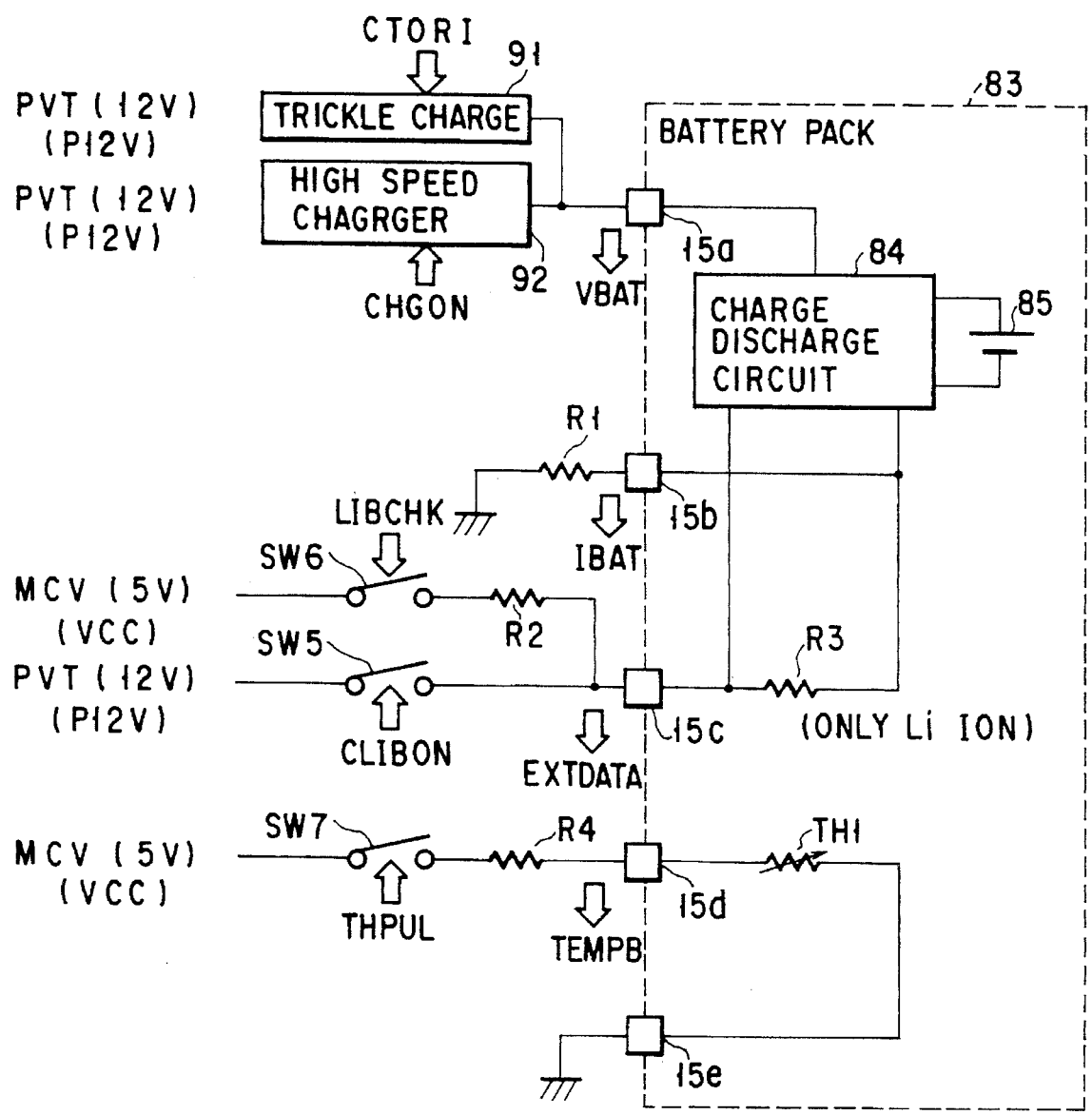
FIG. 9 is a diagram showing the arrangement for connecting part of the power supply board of the embodiment shown in FIG. 7 and a battery pack.

The detailed arrangement of the battery pack 83 will be described below. FIG. 9 shows the arrangement for connecting part of the data processing apparatus main body and the interior of the battery pack 83 using the Li ion battery.

Referring to FIG. 9, the voltage PVT (P12V described above) of 12 V is applied to a trickle charge circuit 91 constituted by the switch SW4 and the diode D4, and the high-speed charge circuit 92. The trickle charge circuit 91 performs charge in response to a signal CTORI from the I/O driver 68 on the apparatus main body side, and the high-speed charge circuit 82 performs charge in response to a signal CHGON (signal (b) in FIG. 8) from the I/O driver 68. Output voltages from the trickle and high-speed charge circuits 91 and 92 are supplied to a charge/discharge circuit 84 in the battery pack through a terminal 15a.

The charge/discharge circuit 84 controls charge of a Li ion battery 85 using this applied voltages. The ground line of the apparatus main body is connected to the charge/discharge circuit 84 through the resistor R1 and a terminal 15b. The terminal 15a is actually used as a positive power supply terminal, and the terminal 15b is actually used as a negative power supply terminal. The terminal voltage value VBAT at the terminal 15a and the terminal current value IBAT at the terminal 15b are monitored on the apparatus main body side.

The voltage MCV (VCC described above) of 5 V is connected to a terminal 15c through the switch SW6 ON/OFF-controlled by a signal LIBCHK and the resistor R2 serving as a pull-up resistor. The voltage PVT of 12 V is connected to the terminal 15c through the switch SW5 ON/OFF-controlled by a signal CLIBON. The terminal 15c is connected to the charge/discharge circuit 84 directly and through the resistor R3.

The terminal 15c serves as a discrimination terminal and a power supply terminal for the charge/discharge circuit 84. In the discrimination mode, the voltage MCV of 5 V is applied to the terminal 15c. In the power supply mode of the charge/discharge circuit 84, the voltage PVT of 12 V is applied to the terminal 15c. The terminal voltage value EXDATA at the terminal 15c is monitored on the apparatus main body side.

The charge/discharge circuit 84 and the resistor R3 are arranged only for the battery pack 83 using the Li ion battery 85. These components are not arranged in the battery pack 14 using the NiH battery shown in FIGS. 1A to 3E.

More specifically, the charge/discharge circuit 84 is a charge/discharge circuit for the Li ion battery 85 whose charge/discharge characteristics are greatly different from those of the NiH battery. The charge/discharge circuit 84 uses the voltage PVT of 12 V applied directly from the terminal 15c as the operating power supply voltage. In the charge mode, the Li ion battery 85 is charged with the power supply voltage for the NiH battery from the apparatus main body. In the discharge mode, control is performed such that the discharge voltage of the Li ion battery 85 is set equal to the discharge voltage of the NiH battery.

Figure 10:
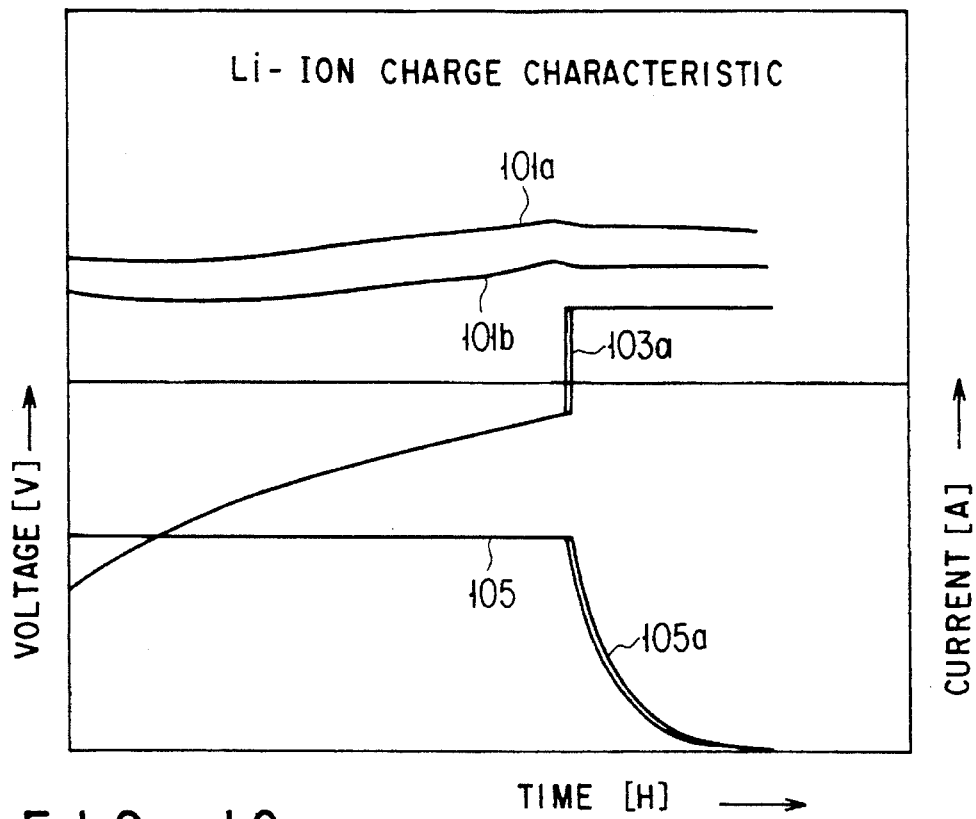
FIG. 10 is a graph showing charge characteristics of an Li ion battery.
Figure 11:
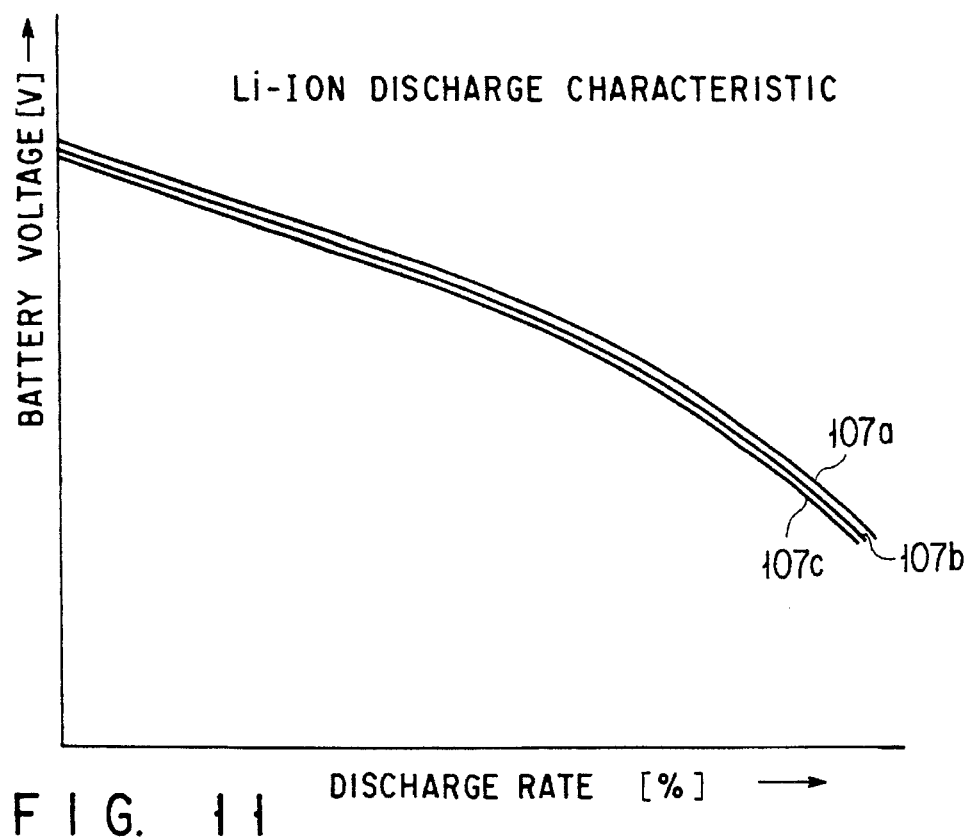
FIG. 11 is a graph showing discharge characteristics of the Li ion battery.

FIGS. 10 and 11 show charge and discharge characteristics of the Li ion battery, respectively.

In FIG. 10, curves 101a and 101b show Li-ion charge characteristics according to different temperatures of the battery. The curve 103 shows voltage characteristics of the Li-ion battery. The double-lined portion 103a indicates that there are two different voltage characteristics. The curve 105 shows current characteristics of the Li-ion battery. The double-lined portion 105a indicates that there are two different current characteristics. FIG. 11 shows Li-ion discharge characteristics in which curves 107a, 107b, and 107c indicate the Li-ion discharge characteristics according to different lots, respectively.

The resistor R3 is arranged to discriminate the battery pack 14 using the NiH battery from the battery pack 83 using the Li ion battery 85.

The voltage MCV of 5 V from the apparatus main body is connected to a terminal 15d through the switch SW7 ON/OFF-controlled by a signal THPUL and the resistor R4 serving as a pull-up resistor. A terminal voltage value TEMPB at the terminal 15d is monitored on the apparatus main body side. A terminal 15e is connected to the ground line on the apparatus main body side. In the battery pack 83, the terminal 15d is connected to the terminal 15e through the thermistor TH1.

The above connecting circuit arrangement is operated as shown in FIG. 12. A program represented by a flow chart in FIG. 12 is stored in the ROM 64 in the power supply control microcomputer 60 shown in FIG. 8. FIG. 12 shows battery discrimination performed by the power supply control processor 30 arranged in the apparatus main body. Battery discrimination is performed every predetermined period or when a battery pack is mounted.

In the initial period of battery discrimination, the signal THPUL is output to turn on the switch SW7. The terminal voltage value TEMPB at the terminal 15d which is changed in accordance with a change in resistance of the thermistor TH1 is detected to determine whether the temperature of the mounted battery pack is appropriate, i.e., whether the temperature falls within the normal range of −10° C. to +70° C. (step S1).

If the battery temperature exceeds the above range and it is determined that the battery temperature is not appropriate, the absence of a battery (step S8) is determined. Data representing the absence of a battery is stored and held in a register in the power supply control processor 30 in the apparatus main body, thereby ending this battery discrimination.

However, if YES in step S1, it is determined with reference to a register in the internal RAM 65 whether no battery is mounted in the previous operation (step S2). If NO in step S2, the battery pack 14 or 83 is not removed, and the previous state remains the same. In this case, battery discrimination is immediately ended.

If YES in step S2, the signal LIBCHK is output to turn on the switch SW6 to pull up the terminal voltage value EXDATA at the terminal 15c (step S3). It is then determined in accordance with the level of the pulled-up terminal voltage value EXDATA whether the resistor R3 is connected, i.e., whether the mounted battery pack is the battery pack 14 using the NiH battery or the battery pack 83 using the Li ion battery 85 (step S4). For example, as shown in FIG. 13, if the battery pack uses an Ni-Cd battery, no resistor is connected. If the battery pack uses an NiH battery (1,700 mAh), a resistor having a resistance Ra is connected. If the battery pack uses an NiH battery (3,000 mAh), a resistor having a resistance Rb is used. If the battery pack uses an Li ion battery, a resistor having a resistance Rc is used. The type of battery can be discriminated in accordance with differences in terminal voltages.

When, for example, the resistance of the pull-up resistor R2, the resistance of the resistor R3, and a ratio of the resistance of the resistor R2 to the resistance of the resistor R3 are set to 47 kΩ, 4.7 kΩ, and 10:1, respectively, it is determined whether the level is decreased by the resistor R3. If the EXDATA level is kept high in step S4, it is determined that the battery pack 14 using the NiH battery is mounted (step S5). The pull-up of the terminal voltage value EXDATA at the terminal 15c is released (step S7), and battery discrimination is then ended.

If the EXDATA data is changed to low level by the resistor R3 in step S4, it is determined that the battery pack 83 using the Li ion battery 85 is mounted (step S6). The switch S6 is turned off, and the pull-up of the terminal voltage value EXDATA at the terminal 15c is released (step S7), and battery discrimination is then ended.

Since each battery cell of the Li ion battery can obtain a high voltage of about 3.5 V, the Li ion battery is advantageous in terms of the capacity and weight as compared with the NiH battery in which a plurality of battery cells must be connected in series with each other because each battery cell generates a voltage of about 1.2 V. The Li ion battery has excellent interchangeablity because it has charge/discharge characteristics equivalent to those of the conventional popular Ni-Cd battery. If the Li ion battery can be used as a power supply in place of the NiH battery having a larger capacity than that of the Ni-Cd battery, a more compact, lightweight apparatus can be realized.

The Li ion battery has charge/discharge characteristics greatly different from those of the Ni-Cd and NiH batteries. In particular, if the Li ion battery is charged/discharged in the same manner as in the Ni-Cd or NiH battery, the Li ion battery may explode.

The charge/discharge circuit 84 for controlling charge/discharge of the Li ion battery 85 is arranged in the battery pack 83 incorporating the Li ion battery 85, as shown in FIGS. 9 and 12. The same charge/discharge control as in the NiH battery or the like can be performed in the apparatus main body, while the charge/discharge circuit 84 charges/discharges the Li ion battery 85 in the battery pack 83.

Details of the charge/discharge circuit 84 and a method of detecting the fully charged state of the Li ion battery will be described with reference to FIG. 14.

FIG. 14 is the detailed circuit diagram of the charge/discharge circuit 84 shown in FIG. 9. When the Li ion battery is kept charged and exceeds a predetermined voltage (e.g., 4.2 V), it may explode, as described above. In charge/discharge control of the Li ion battery, the voltage of the Li ion battery must be controlled to fall within a predetermined voltage range (e.g., 4.2±0.5 V). In this embodiment, the Li ion battery cell is not charged during the operation of the battery.

A first comparator 91 is a circuit for checking overcharge of a Li ion battery cell 85 to determine whether the battery voltage of the Li ion battery cell 85 is higher than a reference voltage $V_{ref1}$ (e.g., 4.2 V + 0.5 V). If the battery voltage is higher than the reference voltage (i.e., overcharge), an overcharge first switch 93 is turned off to interrupt applying a charge voltage $V_{bat}$ to the Li ion battery cell 85. As a result, the voltage of the Li ion battery cell can be prevented from exceeding the predetermined voltage (4.2 V + 0.5 V), thereby preventing explosion. Note that the first switch 93 is a normally closed switch.

A second comparator 92 is a circuit for checking overdischarge of the Li ion battery 85. The comparator 92 detects that the voltage of the Li ion battery cell 85 is lower than a reference voltage $V_{ref2}$ (e.g., 4.2 V − 0.5 V). If the voltage of the Li ion battery cell 85 is lower than the reference voltage $v_{ref2}$ (overdischarge), a second switch 94 is turned off. As a result, the battery charge voltage is applied to the Li ion battery cell 85.

In the charge/discharge circuit 84 having the above arrangement, in the discharge mode, the first and second switches 93 and 94 are turned on to apply the battery voltage to a load. In the overdischarged state, the battery voltage becomes lower than the reference voltage, and the second comparator 92 outputs a signal for turning off the second switch 94. As a result, the second switch 94 is turned off, and the battery voltage from the Li ion battery cell 85 is interrupted.

In the charge mode, an AC adapter is connected. Upon connection of the AC adapter, the load of the Li ion battery cell 85 is eliminated, and then the battery voltage of the Li ion battery cell 85 is increased. For this reason, the voltage at the second switch 94 is higher than the reference voltage Vref2, and the second comparator 92 outputs a signal for turning on the second switch 94. In the overcharged state, i.e., when the battery voltage of the Li ion battery cell 85 is higher than the reference voltage vref1, the first comparator 91 outputs a signal for turning off the first switch 93. As a result, the first switch 93 is turned off to prevent overcharge.

Trickle charge control of the Li ion battery is not basically performed. However, trickle charge is performed only if the DC output is ON and the charge voltage is less than a full charge voltage. Trickle charge control is basically the same as that of the NiH battery. The details of trickle charge control of the NiH battery are described in, e.g., U.S. Ser. No. 784,714 (Inventor: Ryozi NINOMIYA) filed on Oct. 30, 1991.

In a state wherein an AC adapter is connected to the computer main body, high-speed charge is performed when the power switch is turned off or the battery is fully charged. High-speed charge control of the Li ion battery is basically the same as that of the NiH battery. The details of high-speed charge control of the NiH battery is described in, e.g., U.S. Ser. No. 784,890 (inventor: Ryozi NINOMIYA; title: "Method and Apparatus for Controlling Power Supply") filed on Oct. 31, 1991.

In the above arrangement, the resistor R3 is arranged as a discriminating means for discriminating an NiH battery or the like from an Li ion battery so as to detect the level of the pull-up resistance of the resistor R3. However, as another discriminating means, data may be directly exchanged between the power supply control processor 30 in the apparatus main body and the charge/discharge circuit 84 in the battery pack 83, or any other means can be employed.

In each embodiment described above, a housing has the same shape, mounting mechanism, and connection terminals as those of a battery pack integrally mounted in a data processing apparatus main body. An external battery connection attachment having an input terminal for receiving a power supply voltage from an external battery arranged outside the data processing apparatus main body is mounted in the data processing apparatus main body in place of the battery pack. The power supply voltage is applied from a large external battery carried by a user in, e.g., a waist bag to the input terminal through a cable or the like. Without impairing portability and without preparation of and exchange to a supplementary battery, the apparatus can be continuously used for a long period of time.

According to the above embodiment, an Li ion battery main body and a charge/discharge circuit for controlling charge/discharge of the Li ion battery main body in accordance with a difference between an NiH battery and an Li ion battery are arranged in a battery pack housing having the same shape, mounting mechanism, and connection terminals as those of a standard battery pack using, e.g., the NiH battery. The battery pack using the Li ion battery can be realized although the data processing apparatus main body uses this battery pack equivalent to the standard battery pack using the NiH battery. The overall weight of the data processing apparatus can be greatly reduced.

In addition, according to the above embodiment, a Li ion battery main body, a charge/discharge circuit for controlling charge/discharge of the Li ion battery main body in accordance with a difference between an NiH battery and an Li ion battery, and discriminating means using, e.g., a resistor for discriminating the Li ion battery main body connected to the discrimination terminal from the standard NiH battery pack are arranged in a battery pack housing having a discrimination terminal and the same shape, mounting mechanism, and connection terminals as those of the standard battery pack using, e.g., the NiH battery. The operating power supply terminal of the charge/discharge circuit serves also as the discrimination terminal. The data processing apparatus main body can discriminate whether the mounted battery pack is a pack using the NiH battery or the Li ion battery. At the same time, the operating power supply terminal of the charge/discharge circuit for controlling charge/discharge of the Li ion battery need not be additionally arranged.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer-system, comprising:

a data processing apparatus main body;

a battery pack housing which is mounted in said data processing apparatus main body using a first type of battery as a standard battery pack and has the same shape, mounting mechanism, and connection terminals as those of said standard battery pack;

a battery main body mounted in said battery pack housing and comprising a second type of battery having charge/discharge characteristics different from those of said first type of battery; and a charge/discharge circuit, arranged in only said battery pack housing of said second type of battery, for controlling the charge/discharge of said battery main body of said second type.

2. The computer system according to claim 1, wherein said first type of battery is a NiH battery and said second type of battery is a Li ion battery.

3. The computer system according to claim 1, wherein said data processing apparatus main body has a power supply CPU and performs the same battery control regardless of said first type of battery and said second type of battery.

4. The computer system according to claim 1, wherein said charge/discharge circuit comprises:

a first interrupting circuit for interrupting overcharge of said second type of battery;

a second interrupting circuit for interrupting overdischarge of said second type of battery;

first comparing means for comparing a battery voltage of said second type of battery with a first reference voltage value and outputting a signal for operating said first interrupting circuit when the battery voltage is higher than the first reference voltage value in a charge mode; and second comparing means for comparing the battery voltage of said second type of battery with a second reference voltage value and outputting a signal for operating said second interrupting circuit when the battery voltage is lower than the second reference voltage value in a discharge mode.

5. A computer system, comprising:

a data processing apparatus main body;

a battery pack housing which is mounted in said data processing apparatus main body using a first type of battery as a standard battery pack and has a discrimination terminal for discriminating a type of battery;

a battery main body mounted in said battery pack housing and comprising a second type of battery having charge/discharge characteristics different from those of said first type of battery;

discriminating means arranged in said battery pack housing, connected to said discrimination terminal, and having electrical discrimination information unique to said second type of battery; and a charge/discharge circuit, arranged only in said battery pack housing of said second type of battery and using an operating power supply terminal thereof as said discrimination terminal, for controlling charge/discharge of said battery main body of said second type.

6. A computer system according to claim 5, wherein said first type of battery is a NiH battery and said second type of battery is a Li ion battery.

7. The computer system according to claim 5, wherein said data processing apparatus main body performs the same battery control regardless of said first type of battery and said second type of battery.

8. The computer system according to claim 5, further comprising: a charge/discharge circuit which comprises:

a first interrupting circuit for interrupting overcharge of said second type of battery;

a second interrupting circuit for interrupting overdischarge of said second type of battery;

first comparing means for comparing a battery voltage of said second type of battery with a first reference voltage value and outputting a signal for operating said first interrupting circuit when the battery voltage is higher than the first reference voltage value in a charge mode; and second comparing means for comparing the battery voltage of said second type of battery with a second reference voltage value and outputting a signal for operating said second interrupting circuit when the battery voltage is lower than the second reference voltage value in a discharge mode.

9. The computer system according to claim 5, wherein said discriminating means includes a resistor connected to said battery main body, such that a resistance of a resistor connected to said first type of battery is different from that connected to said second type of battery.

10. A computer system, comprising:

a data processing apparatus main body;

a battery pack housing which is mounted in said data processing apparatus main body using a first type of battery as a standard battery pack and has a discrimination terminal for discriminating a type of battery;

a battery main body mounted in said battery pack housing and comprising a second type of battery having charge/discharge characteristics different from those of said first type of battery;

discriminating means arranged in said battery pack housing of said second type of battery, connected to said discrimination terminal, and having electrical discrimination information unique to said second type of battery; and a charge/discharge circuit, arranged only in said battery pack housing of said second type of battery and using an operating power supply terminal thereof as said discrimination terminal, for controlling charge/discharge of said battery main body of said second type.

11. The computer system according to claim 10, wherein said first type of battery is a NiH battery and said second type of battery is a Li ion battery.

12. The computer system according to claim 10, wherein said data processing apparatus main body performs the same battery control regardless of said first type of battery and said second type of battery.

13. The computer system according to claim 10, wherein said charge/discharge circuit comprises:

a first interrupting circuit for interrupting overcharge of said second type of battery;

a second interrupting circuit for interrupting overdischarge of said second type of battery;

first comparing means for comparing a battery voltage of said second type of battery with a first reference voltage value and outputting a signal for operating said first interrupting circuit when the battery voltage is higher than the first reference voltage value in a charge mode; and second comparing means for comparing the battery voltage of said second type of battery with a second reference voltage value and outputting a signal for operating said second interrupting circuit when the battery voltage is lower than the second reference voltage value in a discharge mode.

14. The computer system according to claim 10, wherein said discriminating means includes a resistor connected to said battery main body, such that a resistance of a resistor connected to said first type of battery is different from that connected to said second type of battery.

15. A computer system, comprising:

a data processing apparatus main body;

a battery pack housing which is mounted in said data processing apparatus main body using a first type of battery as a standard battery pack and has a first terminal serving as a positive power supply terminal, a second terminal serving as a negative power supply terminal, a third terminal for discriminating a type of battery, and fourth and fifth terminals for detecting a battery temperature;

a battery main body arranged in said battery pack housing, connected to said first and second terminals, and comprising a second type of battery having charge/discharge characteristics different from those of said first type of battery;

discriminating means arranged in said battery pack housing of said second type of battery, connected to said third terminal, and having electrical discrimination information unique to said second type of battery;

a charge/discharge circuit, arranged only in said battery pack housing of said second type of battery and using operating power supply terminals thereof as said third and second terminals, for controlling charge/discharge of said battery main body of said second type; and temperature detecting means, arranged in said battery pack housing and connected between said fourth and fifth terminals, for generating electrical discrimination information corresponding to the battery temperature of said second type of battery.

16. The computer system according to claim 15, wherein said first type of battery is a NiH battery and said second type of battery is a Li ion battery.

17. The computer system according to claim 15, wherein said data processing apparatus main body performs the same battery control regardless of said first type of battery and said second type of battery.

18. The computer system according to claim 15, wherein said charge/discharge circuit comprises:

a first interrupting circuit for interrupting overcharge of said second type of battery;

a second interrupting circuit for interrupting overdischarge of said second type of battery;

first comparing means for comparing a battery voltage of said second type of battery with a first reference voltage value and outputting a signal for operating said first interrupting circuit when the battery voltage is higher that the first reference voltage value in a charge mode; and second comparing means for comparing the battery voltage of said second type of battery with a second reference voltage value and outputting a signal for operating said second interrupting circuit when the battery voltage is lower than the second reference voltage value in a discharge mode.

19. A computer system according to claim 15, wherein said discriminating means includes a resistor connected to said battery main body, such that a resistance of a resistor connected to said first type of battery is different from that connected to said second type of battery.

20. A battery discrimination control method executed by a data processing apparatus in which one of a first type of battery pack and a second type of battery pack having charge/discharge characteristics different from those of said first type of battery pack can be mounted in a battery pack mounting portion, comprising the steps of:

(a) determining, on the basis of information from a temperature detection terminal of connection terminals of said battery pack mounting portion, if a temperature of one of said first type of battery pack and said second type of battery pack falls within an appropriate temperature range;

(b) determining, if the temperature is determined to be within the appropriate temperature range in step (a), if one of said first type of battery pack and said second type of battery pack was mounted in a previous operation of the data processing apparatus;

(c) inputting discrimination information of the mounted battery pack through a discrimination terminal arranged independently of said temperature detection terminal of said connection terminals of said battery pack mounting portion if none of the first type of battery pack and said second type of battery pack is determined in step (b) to have been mounted in the previous operation of the data processing apparatus;

(d) determining on the basis of the discrimination information input if the input discrimination information is unique to said second type of battery;

(e) discriminating that said first type of battery pack is mounted in said battery pack mounting portion when the discrimination information is determined in the information determination step (d) not to be unique to said second type of battery pack;

(f) discriminating that said second type of battery pack is mounted in said battery pack mounting portion when the discrimination information is determined in the determining step (d) to be unique to said second type of battery pack; and (g) releasing an input state of the discrimination information input in the discrimination information inputting step upon execution of at least one of the discriminating step (e) and the discriminating step (f).

21. The method according to claim 20, wherein the battery discrimination control is terminated when it is determined that one of said first type of battery pack and said second type of battery pack was mounted in the previous operation.

22. The computer system according to claim 1, wherein said charge/discharge circuit performs a trickle charge if an AC adapter is connected to the data processing apparatus main body and a charge voltage of said second type of battery is less than a full charge voltage.

23. The computer system according to claim 10, wherein said charge/discharge circuit performs a trickle charge if an AC adapter is connected to the data processing apparatus main body and a charge voltage of said second type of battery is less than a full charge voltage.

24. The computer system according to claim 15, wherein said charge/discharge circuit performs a trickle charge if an AC adapter is connected to the data processing apparatus main body and a charge voltage of said second type of battery is less than a full charge voltage.

25. The computer system according to claim 3, wherein said data processing apparatus main body performs a high-speed charge when a power switch is turned off or the first type of battery or the second type of battery is fully charged in a state wherein an AC adapter is connected.

26. The computer system according to claim 7, wherein said data processing apparatus main body performs a high-speed charge when a power switch is turned off or the first type of battery or the second type of battery is fully charged in a state wherein an AC adapter is connected.

27. The computer system according to claim 12, wherein said data processing apparatus main body performs a high-speed charge when a power switch is turned off or the first type of battery or the second type of battery is fully charged in a state wherein an AC adapter is connected.

28. The computer system according to claim 17, wherein said data processing apparatus main body performs a high-speed charge when a power switch is turned off or the first type of battery or the second type of battery is fully charged in a state wherein an AC adapter is connected.

29. A computer system, comprising:

data processing apparatus main body;

a battery pack housing configured to hold a standard first type battery which is mounted in said data processing apparatus main body having a power supply control processor;

a battery main body mounted in said battery pack housing and comprising a second type of battery having charge/discharge characteristics different from those of said first type of battery;

discriminating means arranged in said battery pack housing and connected to the power supply control processor, for discriminating the first type of battery and the second type of battery by exchanging data between the power supply control processor and said discriminating means; and a charge/discharge circuit, arranged only in said battery pack housing of said second type of battery and using an operating power supply terminal thereof as said discrimination terminal, for controlling charge/discharge of said battery main body of said second type.

* * * * *